Figure 1:
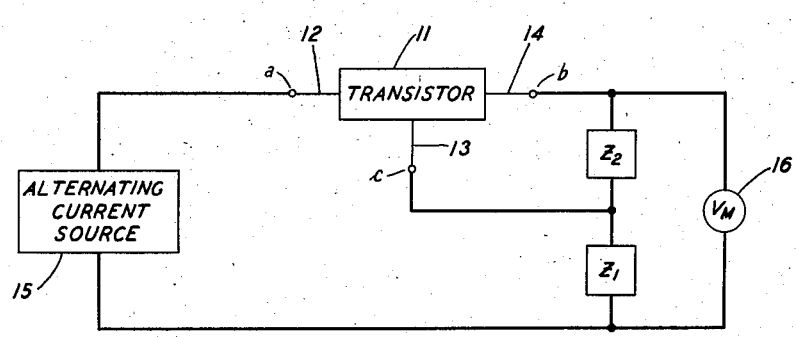

July 28, 1959 G. RAISBECK 2,897,448
CIRCUIT FOR MEASURING ALPHA OF TRANSISTORS
Filed June 23, 1953

INVENTOR
G. RAISBECK
BY N. S. Ewing
ATTORNEY

United States Patent Office 2,897,448
Patented July 28, 1959

2,897,448

CIRCUIT FOR MEASURING ALPHA OF TRANSISTORS

Gordon Raisbeck, Basking Ridge, N.J., assignor to Bell Telephone Laboratories, Incorporated, New York, N.Y., a corporation of New York Application June 23, 1953, Serial No. 363,608

15 Claims. (Cl. 324—158)

This invention relates to transistor circuits; in the specific embodiments described below, the invention is primarily concerned with measurement of the current amplification factor alpha ($\alpha$) of a transistor.

The current amplification factor of a transistor is defined as $$\alpha = -\left(\frac{\partial I_c}{\partial I_e}\right) V_c = \text{const.} \tag{1}$$

where $I_c$, $I_e$, and $V_c$ are the total collector current, emitter current, and collector voltage, respectively, of the transistor. If the small alternating-current components of these currents and voltages are designated by lower case letters, $\alpha$ can be written.

$$\alpha = -\frac{i_c}{i_e} \tag{2}$$

when $V_c$ equals zero.

Alpha is an important design parameter. With point-contact transistors, $\alpha$ is generally greater than one, whereas with junction transistors, it is generally less than one. In some cases, it is important to know the value of $\alpha$ to three or more significant figures. For example, with grounded emitter configuration, the short-circuit current gain in the ratio.

$$\frac{\alpha}{1-\alpha}$$

As $\alpha$ approaches one, as it will with many junction transistors, this ratio will vary a great deal with very small changes in $\alpha$.

The measurement of $\alpha$ is complicated somewhat by the fact that $\alpha$ has a phase shift with changes in frequency. In many applications, the phase angle of $\alpha$ is as important as its magnitude. This phase angle is shown approximately by the following expression which describes $\alpha$ at a given frequency in terms of $\alpha$ at low frequency $$\alpha = \frac{\alpha_0}{1 + j\frac{f}{f_c}} \tag{3}$$

where $\alpha_0$ is the current amplification factor at low frequencies, $f$ is the frequency at which the value of $\alpha$ is desired, and $f_c$ is the frequency at alpha cut-off, i.e., the frequency at which the magnitude of $\alpha$ is $$\frac{\alpha_0}{\sqrt{2}}$$

(See Wallace, Schimpf, and Dickten: "A Junction Transistor Tetrode for High-Frequency Use," Equation 1, and Pritchard: "Frequency Variations of Current-Amplification Factor for Junction Transistors," 40 Proc. I.R.E. 1395 and 1476, November 1952, respectively.) Although it is possible thus to calculate the phase of $\alpha$ from its magnitude, this calculation will yield only an approximation and, also, an approximation whose accuracy decreases as the frequency is increased beyond alpha cut-off. Therefore, if it is desired to know the phase angle of $\alpha$ when the magnitude of $\alpha$ is, for example $$\frac{\alpha_0}{10}$$

such a calculation will yield a result which may be of little value.

It is, therefore, an object of the invention to accurately determine by relatively simple circuits and adjustments the magnitude and phase angle of $\alpha$ at any desired frequency.

In accordance with an illustrative embodiment of the invention described in more detail below, an alternating current is applied to the transistor whose $\alpha$ is to be determined. The transistor is connected as an amplifier in grounded emitter configuration and is terminated in a small load resistor. The same current applied to the transistor is also passed through a variable impedance across which is developed a voltage out of phase with the voltage developed across the load resistor. By varying the latter impedance, the net voltage developed across both the variable impedance and the load resistor in series is reduced to zero. When this null is obtained, the magnitude and phase angle of $\alpha$ may be readily determined from an expression involving only the values of the resistor and the impedance.

A feature of the illustrative embodiment described below is that the variable impedance employed has an amplitude- and phase-frequency characteristic similar to $$\frac{\alpha}{1-\alpha}$$

so that if the impedance is adjusted to obtain a null at one frequency, this balance will hold over a relatively wide band of frequencies. This also permits the use of a current source whose frequency need not be accurately controlled.

Another feature of the invention is that constant current sources are avoided by passing the same current through both the transistor under test and the variable impedance.

Figure 2:
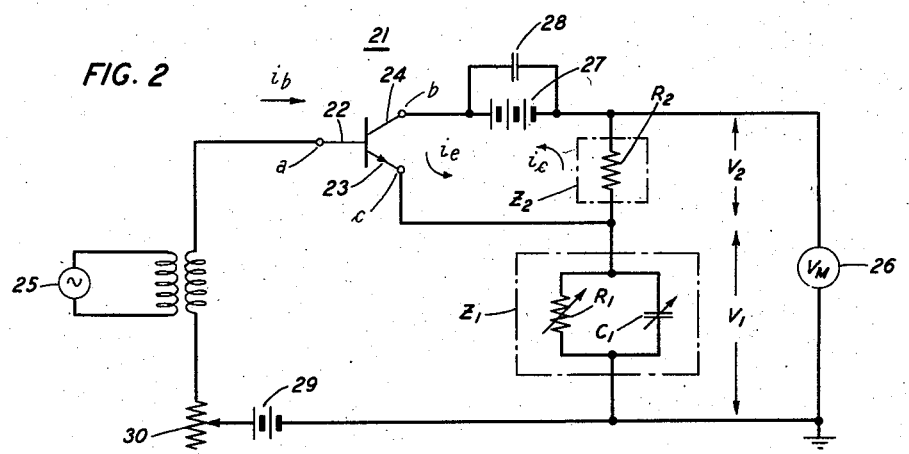
Figures 2A, 2B:
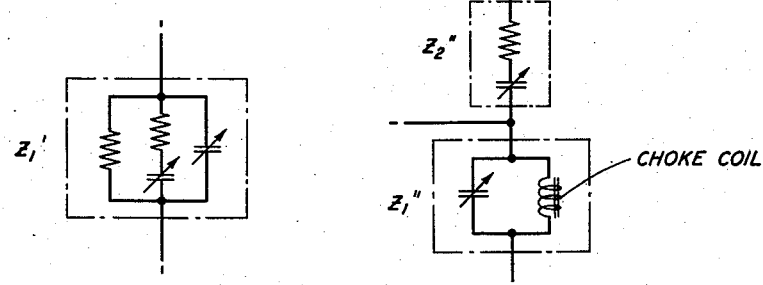

Another feature of the invention is that a direct phase measurement of two quantities at different places in the circuit, which is difficult at high frequencies, is avoided. These and other features and objects of the invention may be more fully appreciated from a consideration of the following detailed description when read in accordance with the attached drawings, in which:

Fig. 1 illustrates by block schematic diagram general principles of the invention; and Figs. 2, 2A, and 2B illustrate specific circuits embodying principles of the invention.

General principles of the invention may be appreciated by considering Fig. 1. The transistor 11 whose $\alpha$ is desired is represented in generalized form as a three-terminal network, each of the terminals $a$, $b$, and $c$ being connected to one of the three electrodes 12, 13, and 14 of the transistor. Current from an alternating-current source 15 is applied to an input circuit connected between terminals $a$ and $c$ and a first impedance $Z_1$ is connected between the source 15 and terminal $c$. The output of the transistor is terminated in a second impedance $Z_2$ which is connected between terminals $b$ and $c$. The net voltage developed across the two impedances is determined by the voltmeter 16.

Appropriate electrodes are chosen for input and output connections so that there is a phase reversal between the electrode 12 to which current is applied and electrode 14 to which $Z_2$ is connected. By this expedient, the voltages across the two impedances $Z_1$ and $Z_2$ are out of phase, and a null in this net voltage may be obtained by adjusting either $Z_1$ or $Z_2$.

The $\alpha$ of the transistor is obtained by adjusting $Z_1$ or $Z_2$ to obtain such a null and by equating the expressions for the voltages developed across the two impedances. Since the current through $Z_1$ will be the same as the input current and since the currents in any two electrodes of the transistor can be related by a factor involving $\alpha$, this equation will yield $\alpha$.

If $Z_1$ and $Z_2$ are merely resistors, a null will be obtained only at low frequencies or when the phase shift of $\alpha$ is a multiple of 360 degrees. Therefore, reactance is provided in one of the impedances to balance the reactive component of the current produced by this phase shift. Since the magnitude of this reactance will come into the voltage equation mentioned above, the solution of this equation will yield an expression of the form $(\alpha + jb)$ so that both the magnitude and phase angle of $\alpha$ can be obtained from this equation.

A specific circuit for measuring the $\alpha$ of an n-p-n junction transistor 21 is shown in Fig. 2. Alternating current from the source 25 is applied to an input circuit connected between the base electrode 22 and the emitter electrode 23. Impedance $Z_1$ is also connected in this circuit so that the current applied to the base electrode 22 will also flow through this impedance which comprises a variable resistor $R_1$ and a variable condenser $C_1$ in parallel. The output of the transistor is terminated in a load resistor $R_2$ which is small relative to $r_c$, the effective internal collector resistance of the transistor. The operating point of the transistor is determined by the battery 27, bypassed by a condenser 28, connected to the collector electrode and by the battery 29 and potentiometer 30 which apply a potential to the base electrode. A voltmeter 26 is connected between the collector end of resistor $R_2$ and the grounded end of impedance $Z_1$. It may be noted that the negative terminal of battery 27 will be at A.-C. ground, when the circuit is adjusted for a null balance since then there will be no voltage developed across the voltmeter 26.

Grounded emitter configuration is employed since this configuration gives a phase reversal between the base and collector electrodes. The voltage $V_1$ developed across impedance $Z_1$ will, at least at low frequencies, be 180 degrees out of phase with the voltage $V_2$ developed across $R_2$, since the input current and the current through $Z_1$ are the same current. This permits attainment of a null in the net voltage drop across the two impedances and also permits a phase comparison without the necessity of a direct phase measurement.

When $R_1$ and $C_1$ are adjusted to obtain a null balance in the net voltage across $Z_1$ and $R_2$, detected by a zero reading on the voltmeter 26, $$V_1 = -V_2 \tag{4}$$

Since $$V_1 = i_b Z_1 \tag{5}$$

and $$-V_2 = i_c R_2 \tag{6}$$

then $$i_b Z_1 = i_c R_2 \tag{7}$$

But $$i_c = \alpha i_e \tag{8}$$

and $$i_b = i_e - i_c \text{ (by Kirchhoff's law)} \tag{9}$$

so that $$i_c = \frac{\alpha}{1-\alpha} i_b \tag{10}$$

Therefore, substituting (10) in (7)

$$i_b Z_1 = i_b \frac{\alpha}{1-\alpha} R_2 \tag{11}$$

and $$\frac{\alpha}{1-\alpha} = \frac{Z_1}{R_2} \tag{12}$$

and $$\alpha = \frac{Z_1}{Z_1 + R_2} \tag{13}$$

Solution of Equation 13 will therefore yield the magnitude and phase angle of $\alpha$ at the frequency of the current supplied by the source 25. For reasons to be explained, however, this equation, substituting the values of $C_1$, $R_1$, and $R_2$ at which a null balance is obtained, will also yield the magnitude and phase angle of $\alpha$ at any desired frequency in a relatively broad band merely by substituting the desired frequency in the expression for $Z_1$. This arises from choosing a $Z_1$ network which has substantially the same amplitude- and phase-frequency characteristic as the expression $$\frac{\alpha}{1-\alpha}$$

namely, a parallel RC network. Therefore, the values of $R_1$ and $C_1$ required to obtain a null balance at one frequency will be substantially the same as those required to obtain a null at any other frequency over this relatively broad band. This not only permits calculation of the magnitude and phase angle of $\alpha$ for a wide band of frequencies by a single adjustment but also reduces the requirements of frequency stability on the source 25 since its exact frequency need not be known.

If desired, the operating point of the transistor may be stabilized by inserting a bypassed resistor in series with the emitter electrode, the magnitude of which is large relative to the magnitude of the internal emitter resistance $r_e$ of the transistor.

Other combinations of impedances $Z_1$ and $Z_2$ may be employed. For example, if the measurements are to be made at very high frequencies, a fixed resistor $R_2$ and an impedance $Z_1'$ such as illustrated in Fig. 2A may be employed. A null balance may be obtained with this combination merely by the adjustment of the two capacitors. Another combination of impedances in which only capacitors are varied and also usable particularly at high frequencies is shown in Fig. 2B. The choke coil in $Z_1''$ acts merely as a direct-current path and is chosen so that it will resonate with its associated capacitor only at a frequency well below the operating frequency.

Alternatively, $Z_1$ may comprise merely a series resistor and $Z_2$ may comprise an impedance having both resistance and reactance. The main requirement is that the voltages across the two impedances be 180 degrees out of phase.

Although the invention has been described as relating to a specific circuit for the measurement of the $\alpha$ of the junction transistor, the invention should not be deemed limited to this specific embodiment, since other modifications and embodiments will readily occur to one skilled in the art.

What is claimed is:

1. In combination, a transistor having three electrodes, means connecting said transistor as an amplifier having an input and an output, a load impedance connected to the output of said amplifier, a source of alternating current, means for applying current from said source to said input, a second impedance, means for passing through said second impedance substantially the same current applied to said input, means for measuring the net voltage developed across both said load impedance and said second impedance, and means for adjusting said net voltage to substantially zero, whereby the current amplification factor of said transistor is given by the ratio of said second impedance to the sum of said second impedance and said load impedance.

2. In combination, a transistor having emitter, collector, and base electrodes, an input circuit connected to two of said electrodes, said input circuit comprising, in series, a source of alternating current and a first impedance, said first impedance having, over a relatively broad band of frequencies, a phase-frequency characteristic similar to the factor $$\frac{\alpha}{1-\alpha}$$

where $\alpha$ is the current amplification factor of the transistor, a second impedance connected between one of said two electrodes and the third electrode, and means for adjusting the net voltage developed across both said impedances to approximately zero, whereby the phase and magnitude of said current amplification factor is given by the complex ratio of said first impedance to the sum of both said impedances.

3. The combination in accordance with claim 2 wherein one of said impedances comprises a resistor and a reactive element.

4. A circuit for determining the current amplification factor $\alpha$ of a transistor having base, collector and emitter electrodes, said circuit comprising a source of alternating current connected between said base and emitter electrodes, an impedance $Z_1$ comprising a resistor in parallel with a capacitor connected in series with said source, and an impedance $Z_2$ connected between said collector and said emitter electrodes, said impedances being adjusted to produce a null in the net voltage across both said impedances, whereby the phase and magnitude of said current amplification factor is given by the complex ratio $$\frac{Z_1}{Z_1+Z_2}$$

5. The combination in accordance with claim 4 wherein said impedances are adjusted so that $Z_1 = \alpha(Z_1+Z_2)$ where $\alpha$ is the current amplification factor of said transistor and whereby said total voltage will be approximately zero.

6. In combination, a transistor having base, collector, and emitter electrodes, a source of alternating current, means for applying current from said source to an input circuit connected between said base and emitter electrodes, an impedance comprising a first resistor in parallel with a capacitor connected in said input circuit between said means and said emitter electrode, a second resistor connected between said collector and the junction of said emitter and said impedance, the value of said second resistor being small relative to the value of the effective internal resistance of said collector electrode, means connected to measure the total voltage developed across said second resistor and said impedance, and means for adjusting said voltage to approximately zero comprising means for varying the magnitudes of said first resistor and said capacitor, whereby the magnitude and phase of the current amplification factor of said transistor is given by the complex ratio of said impedance to the sum of said impedance and said second resistor.

7. The method of measuring the current amplification factor of a transistor amplifier which comprises the steps of applying an alternating current to the transistor, applying said current to a variable impedance, deriving an output voltage from the amplifier and balancing the phase and amplitude of this voltage with the phase and amplitude of the voltage developed across said impedance.

8. The method of measuring the current amplification factor $\alpha$ of a transistor which comprises the steps of applying an alternating current to the transistor, applying said current to a variable impedance $Z_1$ which, over a relatively broad band of frequencies, has substantially the same phase-frequency characteristic as $$\frac{\alpha}{1-\alpha}$$

applying the output current of said transistor to a second impedance $Z_2$, and balancing the voltages across the two impedances, whereby the ratio $$\frac{Z_1}{Z_1+Z_2}$$

represents said current amplification factor.

9. In combination, a transistor having first, second, and third electrodes, an input circuit connected between said first and second electrodes and comprising a source of alternating current and a first impedance $Z_1$, a second impedance $Z_2$ connected between said second and third electrodes, said impedances being related by the expression $$Z_2\left(\frac{\alpha}{1-\alpha}\right)=Z_1$$

where $\alpha$ is the current amplification factor of the transistor, whereby the phase and magnitude of said current amplification factor is given by the complex ratio $$\frac{Z_1}{Z_1+Z_2}$$

10. The combination in accordance with claim 9 wherein said first, second, and third electrodes are the base, emitter, and collector electrodes, respectively.

11. In combination, a transistor having three electrodes, a first pair of said electrodes defining an input circuit and a second pair of said electrodes defining an output circuit, one of said electrodes being common to said input and output circuits, a source of alternating current coupled to said input circuit, a first impedance connected effectively in series with said source and to said one electrode, a second impedance connected in said output circuit and also to said one electrode, means connected to measure the net voltage across both said impedances, and means for adjusting said net voltage to zero, whereby the phase and magnitude of the current amplification factor of said transistor is given by the complex ratio of said first impedance to the sum of both said impedances.

12. In combination, a transistor having base, collector, and emitter electrodes, a source of alternating current, means for applying current from said source to said base electrode, an input circuit including said means and connected between said base and emitter, a first impedance connected in said input circuit between said means and said emitter, a second impedance connected between said collector and the junction of said emitter and said first impedance, means connected to measure the net voltage across both said impedances, and means for adjusting said net voltage to approximately zero, whereby the phase and magnitude of the current amplification factor of said transistor is given by the complex ratio of said first impedance to the sum of both said impedances.

13. The combination in accordance with claim 12 wherein said measuring means comprises a voltmeter.

14. A transistor having base, emitter, and collector electrodes, a source of alternating current, a first resistor and a second resistor at least one of which is variable, a first circuit interconnecting said base and emitter electrodes and including said source and one of said resistors, a second circuit interconnecting said emitter and collector electrodes and including the other of said resistors, and means for detecting a null in the net voltage across both said resistors, whereby the current amplification factor of said transistor is given by the ratio of the magnitude of said first resistor to the sum of the magnitudes of both said resistors.

15. In a test set for measuring the current amplification factor of a transistor having first, second and third electrodes, an input circuit connected between said first and second electrodes and comprising a source of alternating current and a first impedance $Z_1$, a second impedance $Z_2$ connected between said second and third electrodes, means for measuring the net voltage across both of said impedances, and means for adjusting at least one of said impedances so that said impedances are related by the expression $$Z_2\left(\frac{\alpha}{1-\alpha}\right)=Z_1$$

where $\alpha$ is the current amplification factor of the transistor, whereby the phase and magnitude of said current amplification factor is given by the complex ratio $$\frac{Z_1}{Z_1+Z_2}$$

References Cited in the file of this patent

UNITED STATES PATENTS

| | | |
|---|---|---|
| 1,831,744 | Laurent | Nov. 10, 1931 |
| 2,195,439 | Wilson | Apr. 2, 1940 |
| 2,213,099 | Adorjan | Aug. 27, 1940 |
| 2,556,296 | Rack | Apr. 20, 1949 |
| 2,550,518 | Barney | Apr. 24, 1951 |
| 2,585,078 | Barney | Feb. 12, 1952 |
| 2,587,697 | Conrad | Mar. 4, 1952 |

OTHER REFERENCES

Lehovec article: "Testing Transistors," Electronics Magazine, June 1949, pages 88–89.

Slade article: "Survey of Transistor Development," Radio and Television News, November 1952, pages 68–69.